United States Patent
Naiki

(10) Patent No.: US 10,581,536 B2
(45) Date of Patent: Mar. 3, 2020

(54) WIRELESS COMMUNICATOR

(71) Applicant: JVC KENWOOD Corporation, Yokohama-shi, Kanagawa (JP)

(72) Inventor: Yasunori Naiki, Yokohama (JP)

(73) Assignee: JVC KENWOOD Corporation, Yokohama-shi (JP)

(*) Notice: Subject to any disclaimer, the term of this patent is extended or adjusted under 35 U.S.C. 154(b) by 0 days.

(21) Appl. No.: 16/289,688

(22) Filed: Mar. 1, 2019

(65) Prior Publication Data

US 2019/0296836 A1 Sep. 26, 2019

(30) Foreign Application Priority Data

Mar. 23, 2018 (JP) .................................. 2018-057259

(51) Int. Cl.
*H04B 17/23* (2015.01)
*H04B 17/318* (2015.01)

(52) U.S. Cl.
CPC ........... *H04B 17/23* (2015.01); *H04B 17/318* (2015.01)

(58) Field of Classification Search
CPC combination set(s) only.
See application file for complete search history.

(56) References Cited

U.S. PATENT DOCUMENTS 6,438,363 B1 * 8/2002 Feder .................... H04W 52/24
455/226.1
6,804,501 B1 * 10/2004 Bradley ............... H03G 3/3036
455/138

FOREIGN PATENT DOCUMENTS

JP 2001-352266 12/2001

* cited by examiner

*Primary Examiner* — Junpeng Chen
(74) *Attorney, Agent, or Firm* — Amin, Turocy & Watson, LLP

(57) ABSTRACT

A wireless communicator includes: a signal strength meter configured to display a signal strength of a received signal; and an AGC circuit configured to perform AGC control for controlling an amplitude of the received signal be in a predetermined range, wherein the AGC circuit is further configured to perform switching, based on a predetermined condition, between two values to provide the switched value to the signal strength meter, one of the values being an AGC signal strength value for displaying the signal strength based on the AGC control, and another of the values being an expanded signal strength value for displaying the signal strength for which the AGC control is not operated based on a value obtained by detecting the received signal.

2 Claims, 5 Drawing Sheets

FIG.3

| S METER DISPLAY VALUE | ANTENNA INPUT LEVEL [dBm] | |
|---|---|---|
| | STANDARD VALUE | DESIRED VALUE |
| S9+60 | -22 | -13 |
| S9+40 | -42 | -33 |
| S9+20 | -62 | -53 |
| S9 | -81 | -73 |
| S7 | -88 | -85 |
| S5 | -95 | -97 |
| S3 | -101 | -109 |
| S1 | -107 | -121 |
| START OF DISPLAY | -110 | -124 |

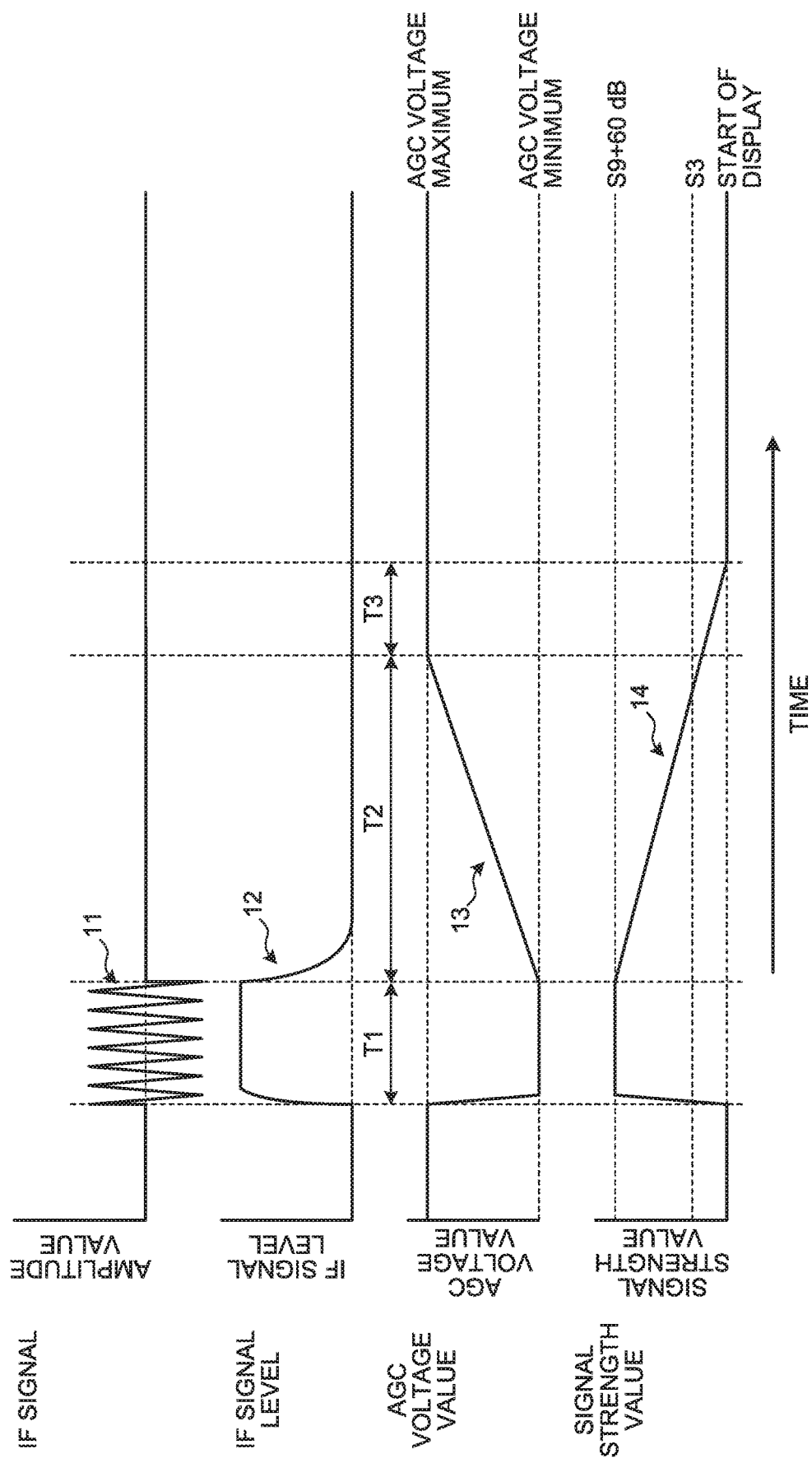

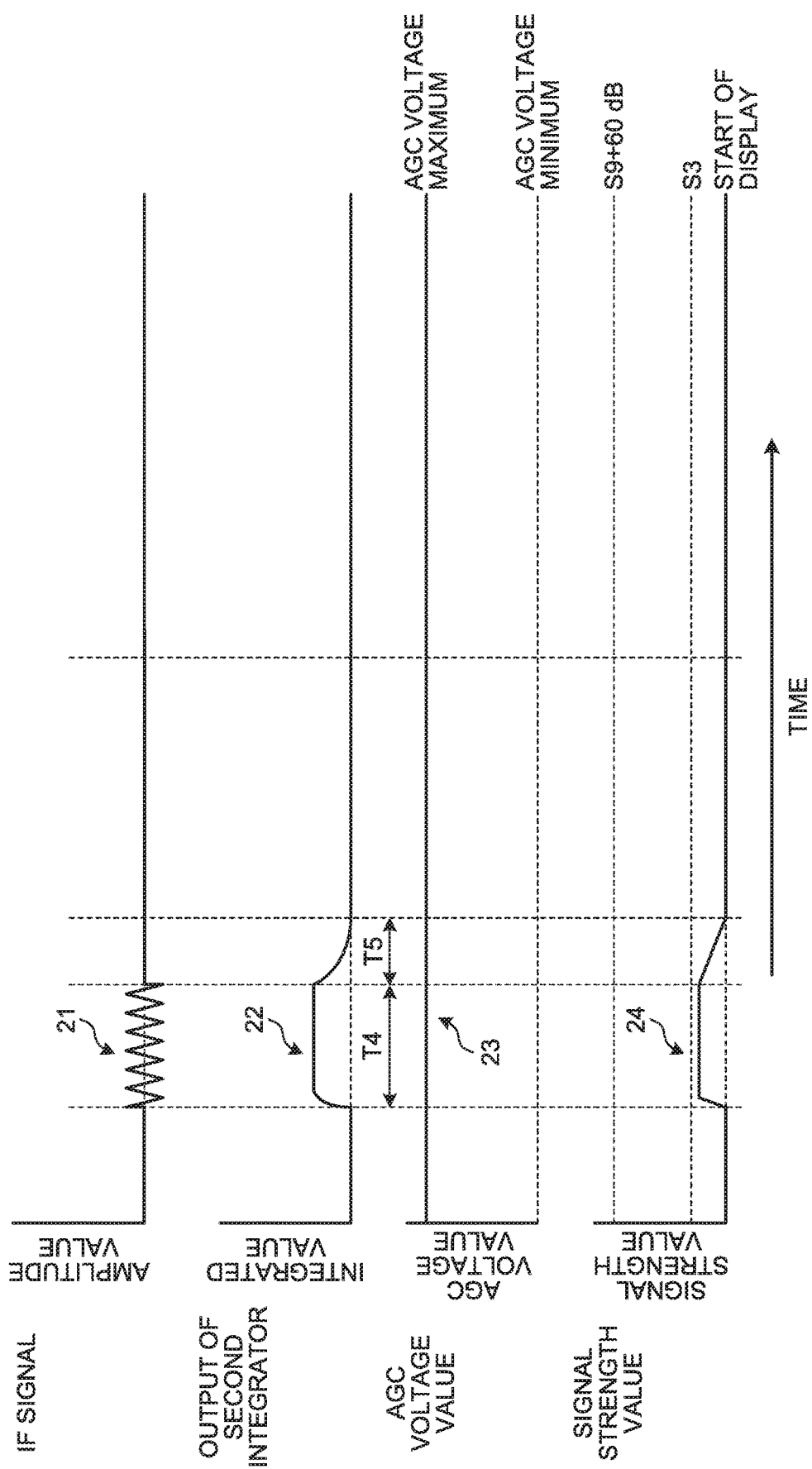

WIRELESS COMMUNICATOR

CROSS-REFERENCE TO RELATED APPLICATION

This application claims priority from Japanese Application No. 2018-057259, filed on Mar. 23, 2018, the contents of which are incorporated by reference herein in its entirety.

FIELD

The present application relates to a wireless communicator.

BACKGROUND

There is a wireless communicator equipped with a signal strength meter (hereinafter called S meter) that displays a signal strength of a received signal.

For example, Japanese Laid-open Patent Publication No. 2001-352266 discloses an electric field intensity detection circuit that can correctly detect an electric field intensity by referring to an S meter voltage and an automatic gain control (AGC) voltage.

The electric field intensity detection circuit described in Japanese Laid-open Patent Publication No. 2001-352266 has an electric field intensity table associated with AGC voltages and S meter voltages, and outputs information of received electric field intensity using the electric field intensity table based on the AGC voltage and the S meter voltage. However, when such an output is displayed for visualization using the electric field intensity detection circuit described in Japanese Laid-open Patent Publication No. 2001-352266, a difference in change between regions of the AGC voltage and the S meter voltage in the display is not considered when the corresponding signal strength changes. Thus, since continuousness of the change in the display cannot be maintained for a signal the signal strength of which extends over the regions of the AGC voltage and the S meter voltage, a sense of incongruity occurs.

SUMMARY

A wireless communicator is disclosed.

According to one aspect, there is provided a wireless communicator, comprising: a signal strength meter configured to display a signal strength of a received signal; and an AGC circuit configured to perform AGC control for controlling an amplitude of the received signal to be in a predetermined range, wherein the AGC circuit is further configured to perform switching, based on a predetermined condition, between two values to output the switched value to the signal strength meter, one of the values being an AGC signal strength value for displaying the signal strength based on the AGC control, and another of the values being an expanded signal strength value for displaying the signal strength for which the AGC control is not operated based on a value obtained by detecting the received signal.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 3 is a table illustrating an exemplary corresponding relation between a display value of an S meter and a strength of a signal input to an antenna;

FIG. 4 is a diagram for explaining an operation of the AGC circuit; and

FIG. 5 is a diagram for explaining an operation of the AGC circuit.

DETAILED DESCRIPTION OF THE PREFERRED EMBODIMENTS

Figure 1:
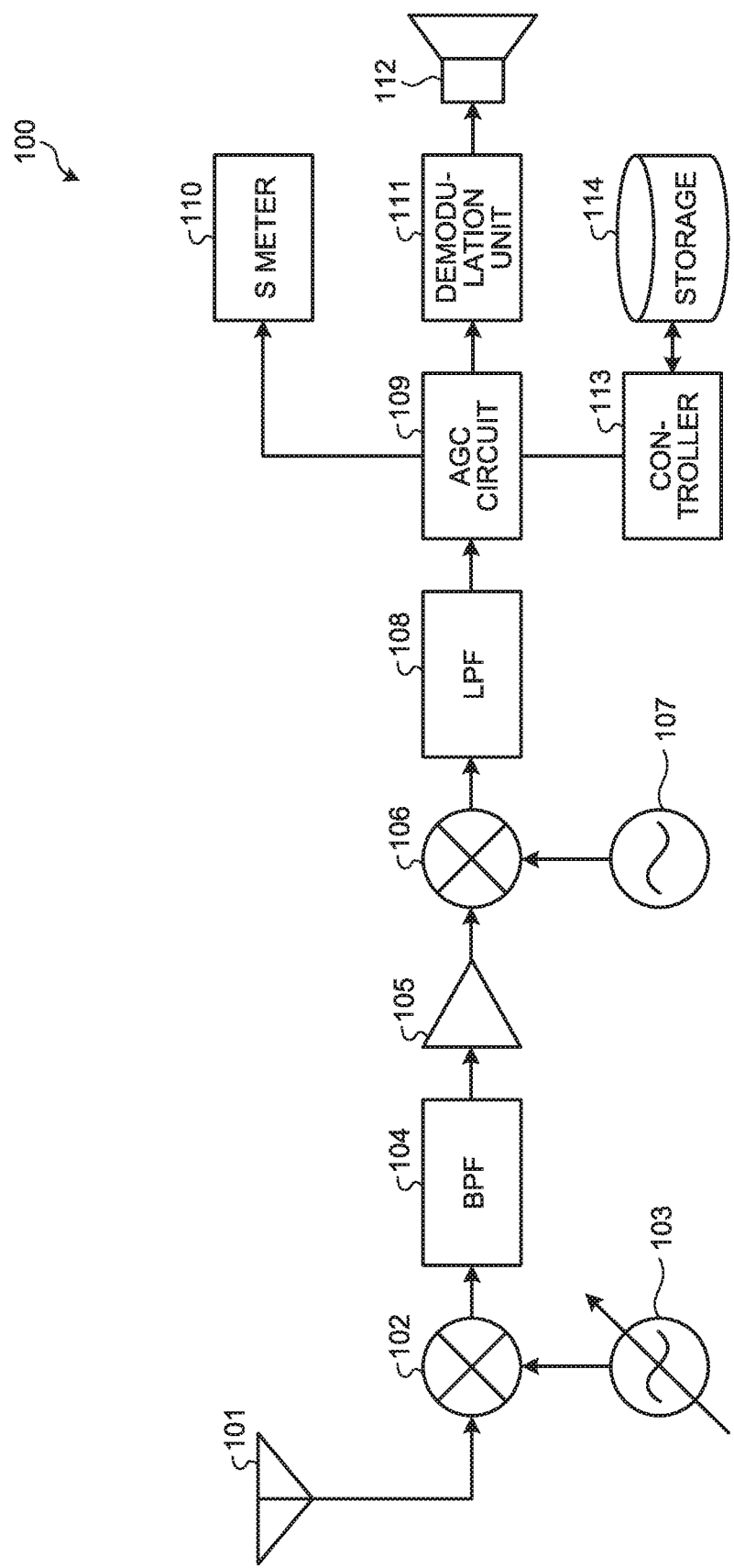
FIG. 1 is a schematic diagram illustrating an exemplary configuration of a wireless communicator according to embodiments of the present application.

Hereinafter, embodiments of the present application will be explained in detail while referring to the drawings. It should be noted that the same reference numerals are provided for the same or corresponding units in the respective drawings, and explanations are appropriately omitted.

A configuration of a wireless communicator according to the embodiments of the present application will be explained by using FIG. 1. FIG. 1 is a schematic diagram illustrating a configuration of the wireless communicator according to the embodiments of the present application.

FIG. 1 illustrates a configuration of a wireless communicator 100 according to Example 1 of the present application. The wireless communicator 100 is provided with an antenna 101, a first mixer 102, a first local oscillator 103, a band pass filter (BPF) 104, an amplifier 105, a second mixer 106, a second local oscillator 107, a low pass filter (LPF) 108, an AGC circuit 109, an S meter 110, a demodulation unit 111, a speaker 112, a controller 113, and a storage 114.

The antenna 101 receives a radio frequency (RF) signal from an external transmitting device. Specifically, the antenna 101 receives a signal that is modulated by a single side band (SSB) system or an amplitude modulation (AM) system. The antenna 101 outputs the received RF signal to the first mixer 102.

The first local oscillator 103 outputs a first local oscillation signal to the first mixer 102. The first mixer 102 generates an intermediate frequency (IF) signal by multiplying the RF signal received from the antenna 101 with the first local oscillation signal received from the first local oscillator 103. The first mixer 102 outputs the generated IF signal to the BPF 104.

The BPF 104 executes filtering out a signal of a specific frequency domain on the IF signal received from the first mixer 102. The BPF 104 outputs the IF signal on which the filtering was executed, to the amplifier 105.

The amplifier 105 is, for example, a low noise amplifier (LNA), that amplifies the IF signal received from the BPF 104. The amplifier 105 outputs the amplified IF signal to the second mixer 106.

The second local oscillator 107 outputs a second local oscillation signal to the second mixer 106. The second mixer 106 generates an IF signal by multiplying the IF signal received from the amplifier 105 with the second local oscillation signal received from the second local oscillator 107. The second mixer 106 outputs the IF signal to the LPF 108.

The LPF 108 executes filtering on the IF signal received from the second mixer 106. The LPF 108 removes high-frequency components of the IF signal on which the filtering was executed, and outputs low-frequency components to the AGC circuit 109.

The AGC circuit 109 amplifies the IF signal received from the LPF 108. The AGC circuit 109 adjusts a gain, and performs control such that an output does not exceed a certain level. Specifically, when an amplitude level of the received signal exceeds a certain level, the AGC circuit 109 adjusts a gain within a linear range that is necessary for preventing a saturation in the wireless communicator 100 to be in a certain amplitude level. The certain amplitude level, also referred to as a reference level, is determined depending on design of the wireless communicator 100. The AGC circuit 109 outputs the amplified IF signal to the demodulation unit 111. In addition, the AGC circuit 109 outputs, to the S meter 110, information that allows a display of a signal strength based on the signal strength of the received RF signal.

The S meter 110 displays the signal strength of the received RF signal that is received by the antenna 101.

The demodulation unit 111 generates an audio signal by demodulating the IF signal received from the AGC circuit 109. The demodulation unit 111 is compatible with, for example, a demodulation by the SSB system and the AM system. The demodulation unit 111 outputs the generated audio signal to the speaker 112.

The speaker 112 outputs the audio signal received from the demodulation unit 111 as a sound.

The controller 113 controls each of the units constituting the wireless communicator 100. Specifically, the controller 113 controls each of the units constituting the wireless communicator 100 by executing a computer program stored in the storage 114. The controller 113 may be implemented with, for example, an electronic circuit that includes a central processing unit (CPU).

The storage 114 stores a computer program for causing the controller 113 to control the wireless communicator 100. The storage 114 is, for example, a semiconductor memory device such as a random access memory (RAM), a read only memory (ROM), or a flash memory, or a storage device such as a hard disk, a solid-state drive, or an optical disk. In addition, the storage 114 may be an external storage device or the like that is connected by wires or without wires.

Figure 2:
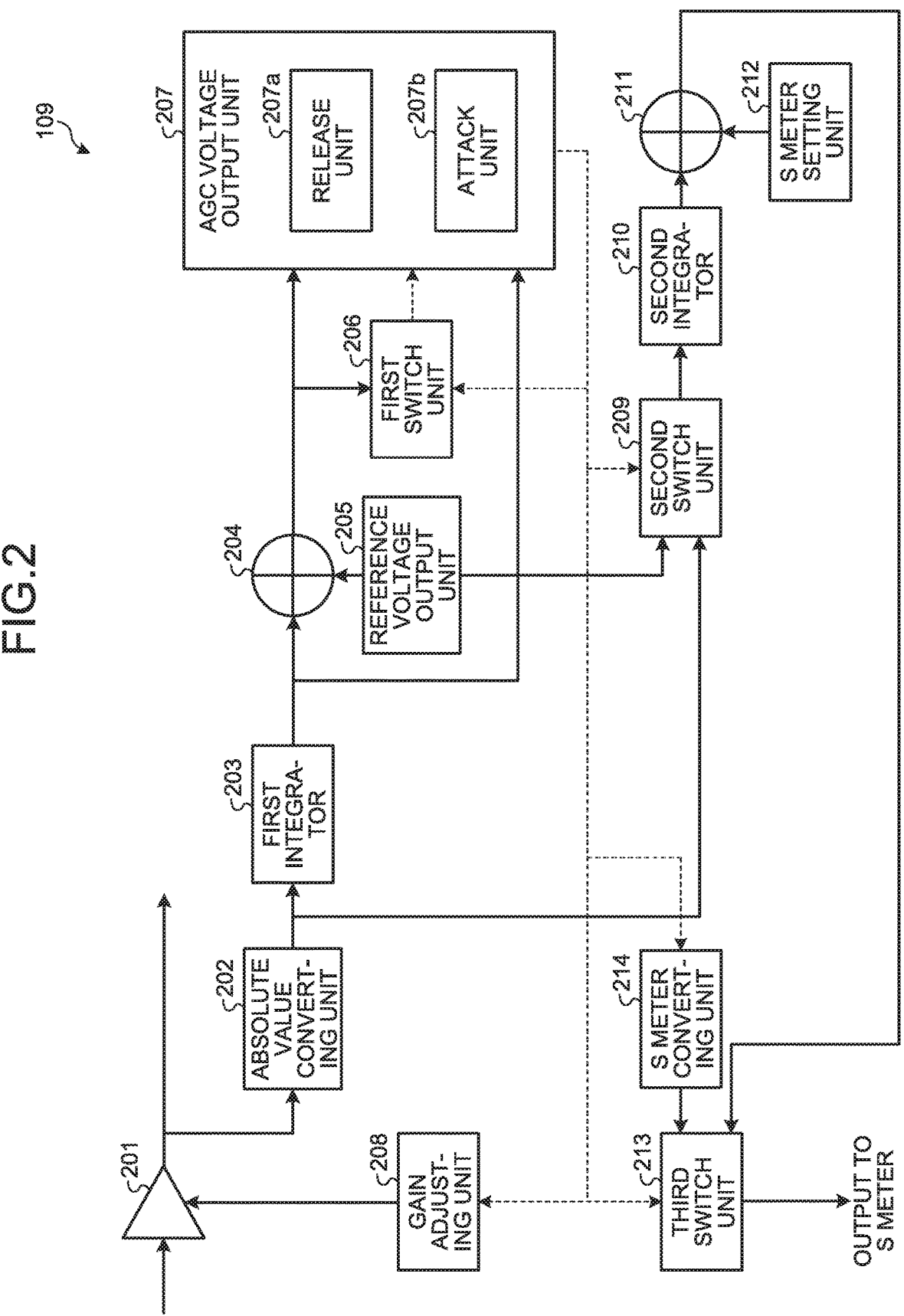
FIG. 2 is a schematic diagram illustrating an exemplary configuration of an AGC circuit.

The AGC circuit 109 will be explained by using FIG. 2. FIG. 2 is a schematic diagram illustrating an exemplary configuration of the AGC circuit 109.

As illustrated in FIG. 2, the AGC circuit 109 is provided with an IF signal amplifying unit 201, an absolute value converting unit 202, a first integrator 203, a first subtractor 204, a reference voltage output unit 205, a first switch unit 206, an AGC voltage output unit 207, a gain adjusting unit 208, a second switch unit 209, a second integrator 210, a second subtractor 211, an signal strength setting unit 212, a third switch unit 213, and an S meter converting unit 214. Each of the units constituting the AGC circuit 109 is controlled by the controller 113.

First, an explanation will be made on how the AGC circuit 109 adjusts a gain of the IF signal amplifying unit 201.

The IF signal amplifying unit 201 amplifies the IF signal received from the LPF 108 illustrated in FIG. 1. An amount of amplification of the IF signal performed by the IF signal amplifying unit 201 is controlled by an AGC voltage value output from the AGC voltage output unit 207. The AGC voltage value is a control signal for controlling the gain of the IF signal amplifying unit 201. In FIG. 2, an arrow indicated by a dotted line shows the AGC voltage value. Specifically, the gain adjusting unit 208 outputs the AGC voltage value to the IF signal amplifying unit 201 as a gain set value. When the gain set value is low, the gain of the IF signal amplifying unit 201 becomes small, and when the gain set value is high, the gain of the IF signal amplifying unit 201 becomes large. Since the upper limit and the lower limit of the gain set value are determined, the maximum value and the minimum value of the gain of the IF signal amplifying unit 201 are also determined. For example, if the upper limit of the AGC voltage value is 1 and the lower limit thereof is 0, the gain adjusting unit 208 sets the maximum value of the gain of the IF signal amplifying unit 201 to 0 dB when the AGC voltage value is 1, and sets the minimum value of the gain of the IF signal amplifying unit 201 to −60 dB when the AGC voltage value is 0. The IF signal amplifying unit 201 outputs the amplified IF signal to the absolute value converting unit 202.

The absolute value converting unit 202 converts the amplified IF signal into an absolute value. This corresponds to a performance of detection on the IF signal. The absolute value converting unit 202 outputs the IF signal that was converted into the absolute value (detected signal) to the first integrator 203 and the second switch unit 209.

The first integrator 203 smooths the detected signal received from the absolute value converting unit 202 by integration with a predetermined time constant, and calculates an IF signal level. This corresponds to a performance of smoothing on the detected IF signal. The first integrator 203 outputs the IF signal level to the first subtractor 204.

The first subtractor 204 calculates a difference (first difference value) between the IF signal level received from the first integrator 203 and a reference value (first reference value) of the AGC input from the reference voltage output unit 205, to compare the IF signal level with the reference value of the AGC. Hereinafter, the reference value of the AGC is also described as the AGC reference. The first subtractor 204 outputs the result of the difference to the first switch unit 206. The AGC reference is a reference value when performing a control such that an output of the AGC circuit 109 does not exceed a certain level. When the amplitude level of the IF signal exceeds the AGC reference level, the AGC circuit 109 decreases the gain of the IF signal amplifying unit 201 to perform a control such that the output does not exceed a certain level.

The AGC voltage output unit 207 outputs the AGC voltage value to the gain adjusting unit 208 to adjust the gain of the IF signal amplifying unit 201. The AGC voltage output unit 207 has a release unit 207a and an attack unit 207b for adjusting the AGC voltage value.

When the amplitude of the IF signal is below the AGC reference, the release unit 207a raises the AGC voltage value to be output. Specifically, the release unit 207a gradually raises the AGC voltage value by a small voltage addition amount per unit time. The release unit 207a raises the AGC voltage value over, for example, several hundred milliseconds to several seconds. In this manner, the gain of the IF signal amplifying unit 201 is also gradually raised.

When the amplitude of the IF signal exceeds the AGC reference, the attack unit 207b lowers the AGC voltage value to be output. Specifically, the attack unit 207b steeply lowers the AGC voltage value by large voltage subtraction amount per unit time. The attack unit 207b lowers the AGC voltage value over a short time of several milliseconds.

The gain adjusting unit 208 adjusts the gain of the IF signal amplifying unit 201 in accordance with the AGC voltage value. More specifically, the gain adjusting unit 208 converts the AGC voltage value into the gain set value to be set in the IF signal amplifying unit 201. Since AGC voltage values and gain set values are associated with each other, the gain adjusting unit 208 is able to convert the AGC voltage value into the gain set value by a numerical calculation. Once the AGC voltage value is raised, the gain adjusting unit 208 increases the gain of the IF signal amplifying unit 201.

Once the AGC voltage value is lowered, the gain adjusting unit 208 decreases the gain of the IF signal amplifying unit 201.

During the reception of a modulating signal by the antenna 101, the wireless communicator 100 adjusts the gain by repeating the aforementioned operations.

The S meter converting unit 214 converts the AGC voltage value into an AGC signal strength value for output to the S meter 110. The AGC signal strength value is output to the S meter 110 through the third switch unit 213. When the AGC voltage value is not the maximum value, the third switch unit 213 performs switching such that the AGC signal strength value is output to the S meter 110. In other words, when the IF signal level exceeds the AGC reference and a gain adjustment is performed on the IF signal amplifying unit 201 by the AGC control, the AGC signal strength value is output to the S meter 110. Thus, an S meter display based on the AGC control is displayed in the S meter.

Next, an explanation will be made on how the AGC circuit 109 causes the S meter 110 to display a signal strength of the IF signal level that is below the AGC reference.

The second switch unit 209 performs switching between the detected signal that was converted into the absolute value in the absolute value converting unit 202 and the AGC reference received from the reference voltage output unit 205, and outputs either of them to the second integrator 210. The second switch unit 209 is configured so as to switch a signal to be output in accordance with the AGC voltage value received from the AGC voltage output unit 207. Specifically, when the AGC voltage value received from the AGC voltage output unit 207 is the maximum value, the second switch unit 209 outputs the IF signal that was converted into the absolute value to the second integrator 210. On the other hand, when the AGC voltage value received from the AGC voltage output unit 207 is not the maximum value, the second switch unit 209 outputs the AGC reference to the second integrator 210. That is, when the AGC voltage received from the AGC voltage output unit 207 is not the maximum value, the second switch unit 209 replaces the detected signal with the AGC reference.

The second integrator 210 integrates the detected signal or AGC reference received from the second switch unit 209 with a predetermined time constant, and outputs a integration result to the second subtractor 211. More specifically, when the AGC voltage value received from the AGC voltage output unit 207 is not the maximum value, the integration result of the second integrator 210 will be a fixed value. In this regard, a time constant set in the second integrator 210 is the same as a time constant set in the release unit 207a. The specific value of the time constant differs depending on modulation system of a radio wave received by the wireless communicator 100. The time constant may be set to a desired value, for example, depending on a sound that a user is to listen to. Meanwhile, the time constants of the release unit 207a and the second integrator 210 are in conjunction.

The second subtractor 211 calculates a difference between the integration result received from the second integrator 210 and a reference value (second reference value) of an IF signal received from the signal strength setting unit 212 that is desired to be displayed on the S meter 110 received from the signal strength setting unit 212. Hereinafter, the reference value is also described as the S meter reference. The second subtractor 211 calculates how much the integration result is higher as compared to the S meter reference, by calculating a difference value between the integration result and the S meter reference. The second subtractor 211 outputs a result of the difference to the third switch unit 213. It should be noted that the S meter reference is a value smaller than the AGC reference. The difference value, which is the result of the difference, is defined as an expanded signal strength value. In addition, the expanded signal strength value may also be regarded as a value based on the detected signal by the absolute value converting unit 202, when the AGC control has not been performed.

During the AGC control, that is, when the AGC voltage value is not the maximum, the third switch unit 213 outputs the AGC signal strength value, which is the output of the S meter converting unit 214, to the S meter 110 as a signal strength value. In addition, when the AGC voltage value is the maximum, the third switch unit 213 outputs the expanded signal strength value, which is the difference value between the S meter reference and the output of the second integrator, as a signal strength value.

An explanation will be made on the relation between the AGC reference and the S meter reference by using FIG. 3. FIG. 3 is a table illustrating an exemplary corresponding relation between a display value of the S meter 110 and a strength of a signal that is input to the antenna 101.

A standard value in FIG. 3 illustrates a correspondence between an antenna input level conventionally used and an S meter display value. The standard value is an exemplary signal level when the S meter displays the S meter display value based on only the AGC voltage. Specifically, the example illustrated in FIG. 3 means that the S meter 110 starts displaying the S meter display value when the antenna input level is −110 dBm. A desired value is a desired signal level when the S meter displays the S meter display value which cannot be displayed based on the AGC voltage. Specifically, the example illustrated in FIG. 3 means that the S meter 110 is desired to start display the signal strength value when the antenna input level is −124 dBm.

More specifically, in order to provide the desired value illustrated in FIG. 3, when assuming that the minimum antenna input level for which the AGC control is performed is not changed from −110 dBm, the AGC reference, i.e., the voltage value that is output from the reference voltage output unit 205, is equivalent to the output value of the first integrator 203 when a signal of −110 dBm is input from the antenna. This will be expressed as a voltage value corresponding to the signal having the level of −110 dBm. By contrast, the S meter reference is equivalent to the output value of the second integrator 210 when a signal of −124 dBm is input from the antenna. This will be expressed as a voltage value corresponding to the signal having the level of −124 dBm. The reference voltage output unit 205 outputs the voltage value (AGC reference) corresponding to the signal having the level of −110 dBm to the first subtractor 204 and the second switch unit 209. The signal strength setting unit 212 outputs the voltage value (S meter reference) corresponding to the signal having the level of −124 dBm to the second subtractor 211. It should be noted that the values illustrated in FIG. 3 are exemplifications, and they do not limit the present application.

As described above, the signal strength value displayed on the S meter 110 is switched at a time when the AGC voltage value is not the maximum value and a time when the AGC voltage value is the maximum value, by the third switch unit 213. The AGC reference is always input to the second integrator 210 when the AGC voltage value is not the maximum value such that the signal strength value displayed on the S meter 110 becomes temporally continuous and smooth when the AGC voltage value is raised and reached the maximum value due to a release operation of the AGC control. This is intended to suppress decrease of the signal strength value when the AGC voltage value changes to the maximum value to display the signal strength value with being temporally continuous and smooth based on the S meter reference value.

In other words, at the time when the AGC voltage value is raised by the time constant of the release by the AGC control and the signal strength value is dropped, the output of the second integrator 210 is a value fixed to the first reference value corresponding to the signal having the level of −110 dBm (AGC reference). When the AGC voltage value reaches the maximum, the output of the second switch unit 209 is switched to the detected signal. In this case, since the first reference value had been input to the second integrator 210 before the switching of output of the second switch unit 209, the input of the second integrator 210 changes to the detected signal from the first reference value. Furthermore, when the AGC voltage value reaches the maximum, the third switch unit 213 performs switching so as to output the expanded signal strength value to the S meter. Since the AGC signal strength value is displayable to −110 dBm, the expanded signal strength value after the switching starts a display from the first reference value corresponding to the signal having the level of −110 dBm. The expanded signal strength values thereafter will be values based on the time constant of the second integrator. Since the time constant of the second integrator is the same as the time constant of the release by the AGC control, continuousness of the values to be output to the S meter is maintained even when the second switch is switched.

An explanation will be made on a change of signal strength values according to the present embodiment, by using FIG. 4 and FIG. 5.

FIG. 4 is a diagram for explaining a change in signal strength values when the IF signal having a high signal strength (e.g., corresponding to 59+60 dB) is input to the AGC circuit 109. FIG. 5 is a diagram for explaining a change in signal strength values when the IF signal of a level that is not subjected to the AGC is input to the AGC circuit 109. FIG. 4 illustrates an amplitude value of the IF signal, the IF signal level, the AGC voltage value, and the signal strength value. In the graph indicating the amplitude value of the IF signal, the horizontal axis indicates times, and the vertical axis indicates the amplitude value of the IF signal. In the graph indicating the IF signal level, the horizontal axis indicates times, and the vertical axis indicates the IF signal level. In the graph indicating the AGC voltage value, the horizontal axis indicates times, and the vertical axis indicates the AGC voltage value. In the graph indicating the signal strength value, the horizontal axis indicates times, and the vertical axis indicates the signal strength value.

The IF signal amplifying unit 201 illustrated in FIG. 2 receives an IF signal 11 having a high signal strength during a time T1. In this case, the first integrator 203 calculates an IF signal level 12 by integrating the IF signal 11 that passed through the absolute value converting unit 202. Once the IF signal amplifying unit 201 receives the IF signal 11, the AGC voltage output unit 207 steeply reduces the AGC voltage that was the maximum value, to the minimum value during the time T1. When the IF signal 11 is no longer input to the IF signal amplifying unit 201, the AGC voltage output unit 207 gently raises an AGC voltage 13 from the minimum value to the maximum value during a time T2 based on the time constant of the release by the AGC control.

The S meter 110 displays an signal strength value 14 based on the AGC voltage 13 during the time between the time T1 in which the IF signal 11 is input to the IF signal amplifying unit 201 and the time T2 in which the AGC voltage output unit 207 raises the AGC voltage 13 from the minimum value to the maximum value. After the AGC voltage 13 has reached the maximum value, the S meter 110 displays the signal strength value 14 based on the expanded signal strength value that is based on the IF signal level 12, in order to smoothly display the time between the time T2 and a time T3.

An explanation will be made, by using FIG. 5, on a display method of the S meter 110 when the IF signal amplifying unit 201 illustrated in FIG. 2 receives an IF signal 21 having a low signal strength (a signal strength of a level that is not subjected to AGC) during a time T4. FIG. 5 illustrates the amplitude value of the IF signal, an output of the second integrator 210, the AGC voltage value, and the signal strength value. In the graph illustrating the amplitude value of the IF signal, the horizontal axis indicates times and the vertical axis indicates the amplitude value of the IF signal. In the graph illustrating the output of the second integrator 210, the horizontal axis indicates times and the vertical axis indicates the integrated value of the second integrator 210. In the graph illustrating the AGC voltage value, the horizontal axis indicates times and the vertical axis indicates the AGC voltage value. In the graph illustrating the signal strength, the horizontal axis indicates times and the vertical axis indicates the signal strength value (expanded signal strength value). In this case, the AGC voltage output unit 207 always outputs an AGC voltage 23 at its maximum value. The S meter 110 displays the expanded signal strength value based on the integrated value from the second integrator 210 as a signal strength value 24, during a time T4 in which the IF signal 21 is input to the IF signal amplifying unit 201 and a time T5 in which an integration result 22 has dropped.

As described above, according to the present embodiment, even if the received signal has a strength below a predetermined strength, a signal strength thereof can be displayed. In addition, continuousness of the display can be maintained even if the received signal has a strength extending over predetermined strengths.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communicator, comprising:
   a signal strength meter configured to display a signal strength of a received signal; and
   an AGC circuit configured to perform AGC control for controlling an amplitude of the received signal to be in a predetermined range, wherein
   the AGC circuit is further configured to perform switching, based on a predetermined condition, between two values to output the switched value to the signal strength meter, one of the values being an AGC signal strength value for displaying the signal strength based on the AGC control, and another of the values being an expanded signal strength value for displaying the signal strength for which the AGC control is not operated based on a value obtained by detecting the received signal, wherein
   the AGC circuit is further configured to perform the AGC control based on a first difference value between a signal level obtained by detecting and smoothing the received signal and a predetermined first reference value, the AGC signal strength value is a value based on the first difference value, the expanded signal strength value is a value based on a second difference value between the value obtained by detecting the received signal and a predetermined second reference value that is smaller than the first reference value, and the predetermined condition is such that the AGC signal strength value is selected when the AGC control is in operation and the expanded signal strength value is selected when the AGC control is not in operation.

2. The wireless communicator of claim 1, wherein the expanded signal strength value is a difference value between an output value of an integrator having a time constant that is the same as a time constant of release by the AGC control obtained by inputting the value obtained by detecting the received signal thereto and the second reference value, when the AGC control is not in operation, and a difference value between an output value of the integrator obtained by inputting the first reference value thereto and the second reference value, when the AGC control is in operation.

* * * * *